US009429042B2

(12) United States Patent
Genin et al.

(10) Patent No.: US 9,429,042 B2
(45) Date of Patent: Aug. 30, 2016

(54) ACOUSTIC DAMPING DEVICE FOR CHAMBERS WITH GRAZING FLOW

(71) Applicant: ALSTOM Technology Ltd, Baden (CH)

(72) Inventors: Franklin Marie Genin, Baden (CH); Devis Tonon, Turgi (CH); Mirko Ruben Bothien, Zürich (CH); Douglas Anthony Pennell, Windisch (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 14/631,945

(22) Filed: Feb. 26, 2015

(65) Prior Publication Data

US 2015/0247426 A1 Sep. 3, 2015

(30) Foreign Application Priority Data

Feb. 28, 2014 (EP) .................................... 14157239

(51) Int. Cl.
*F02C 7/24* (2006.01)
*F01D 25/30* (2006.01)
*F23R 3/06* (2006.01)

(52) U.S. Cl.
CPC ................. *F01D 25/30* (2013.01); *F23R 3/06* (2013.01); *F05D 2220/32* (2013.01); *F05D 2260/96* (2013.01); *F23R 2900/00014* (2013.01)

(58) Field of Classification Search
CPC ........... F23R 2900/00014; F23R 3/06; F23M 20/005; F02C 7/24; F01D 25/30
USPC .................................... 181/213, 250; 60/725
See application file for complete search history.

(56) References Cited

U.S. PATENT DOCUMENTS

2005/0097890 A1* 5/2005 Ikeda ...................... F23R 3/002 60/748
2014/0345283 A1* 11/2014 Prade ........................ F23R 3/16 60/725
2015/0082794 A1* 3/2015 Schilp ..................... F01D 9/023 60/722

FOREIGN PATENT DOCUMENTS

EP 1 865 259 A2 12/2007
WO 2013/029981 A1 3/2013

* cited by examiner

*Primary Examiner* — Jeremy Luks
(74) *Attorney, Agent, or Firm* — Buchanan Ingersoll & Rooney PC

(57) ABSTRACT

An acoustic damping device is provided which includes at least one opening for a sealing gas to deflect a grazing gas flow away from the mouth of an acoustic damper.

17 Claims, 7 Drawing Sheets

ACOUSTIC DAMPING DEVICE FOR CHAMBERS WITH GRAZING FLOW

CROSS-REFERENCE TO RELATED APPLICATIONS

This application claims priority to EP application 14157239.6 filed Feb. 28, 2014, the contents of which are hereby incorporated in its entirety.

TECHNICAL FIELD

The invention relates to the acoustic damping of combustion dynamics. Combustion dynamics in the meaning of this application comprises pulsations, acoustic oscillations, pressure and velocity fluctuations and what is called in the everyday language "noise".

BACKGROUND OF INVENTION

Combustion dynamics occur in combustors of gas turbines, for example, as a consequence of changes in the fuel supply. Excessive pressure fluctuations may result in damage of machine components. For reasons of simplification subsequently the term "chamber" is used and comprises all locations where combustion dynamics occur. In these chambers a gas (for example a mixture of fuel and air or a hot combustion gas) flows with a high velocity.

To reduce these combustion dynamics it is well known in the art, to install acoustic damping devices like Helmholtz resonators, half-wave tubes, quarter-wave tubes or other types of damping devices with or without flow through of gas.

These acoustic damping devices may have one or more resonance frequencies. If under operation of the gas turbine the combustion dynamics stimulate the resonance frequencies of the acoustic damping devices, the combustion dynamics are reduced or damped.

FIG. 1 illustrates the reflection coefficient (Y-Axis) and its dependency from the frequency.

The line 1 shows the theoretical reflection coefficient when using an acoustic damping device with a resonance frequency of approximately 300 Hertz. As can be seen, at a frequency of 300 Hertz the reflection coefficient has a relative minimum of approximately 0.5. At frequencies of approximately 225 Hertz and 375 Hertz, the reflection coefficient has a local maximum of about 0.75.

To give an example: a combustion chamber of a gas turbine is equipped with an acoustic damping absorber having a resonance frequency of 300 Hertz. Assuming that under operation in this combustion chamber fluctuations ensue comprising frequencies of 300 Hertz it can be expected that due to the local minimum of the reflection coefficient at 300 Hertz the fluctuations with a frequency of 300 Hertz are effectively damped and reduced.

In technical experiments the applicant made measurements and compared the theoretical reflection coefficient (line 1) with measurements taken at a frequency range between 50 Hertz and 400 Hertz.

The measured values are illustrated in FIG. 1 by dots 3.

By comparing the measured values with the theoretical reflection coefficient (line 1) it can be seen that in the range between 250 Hertz and 350 Hertz the measured values 3 do not show a local minimum as should be expected. In other words: The acoustic damping device does not work sufficiently.

SUMMARY OF THE INVENTION

It is an object of the invention, to provide an acoustic damper that is capable of damping effectively in a gas turbine under operation and therefore effectively reduces combustion dynamics ensued from operation of the gas turbine at certain frequencies.

This objective has been achieved by using an acoustic damper comprising a neck and a damping volume, wherein the neck comprises a mouth being in fluid connection with a chamber that comprises adjacent to the mouth of the neck at least one opening for sealing gas.

The sealing gas, air or any other suitable gas that flows through the at least one opening into the chamber has the effect of a "fence" or a shield that protects the mouth of the damper from grazing flow. In conjunction with the claimed invention grazing flow is the flow of a gas more or less parallel to a wall that comprises the mouth of the damper. This grazing flow has a main or preferred direction more or less perpendicular to the neck of the damper and therefore may disturb the bias flow of gas through the neck and the mouth into the damping volume.

By means of the claimed opening or a number of openings located adjacent to the mouth of a damper the grazing flow is deflected and therefore does not disturb the bias flow through the neck and the mouth of the damper and as a result the performance of the damper is improved.

In a preferred embodiment of the claimed invention the at least one opening for sealing gas is located upstream of the mouth so as to deflect the grazing gas flow away from the mouth of the damper. If this opening is located upstream of the mouth it most efficiently protects the mouth from the grazing gas flow.

To even more efficiently deflect the grazing flow away from the mouth of the damper it may be advantageous to provide two or more openings upstream of the mouth. In embodiments where the preferred direction of the grazing flow may change it is preferred if three, four or even more openings are located around the mouth of the damper so as to deflect the grazing flow independent from its actual direction of flow and to protect the mouth of the damper from the grazing flow.

To optimize the effect of the claimed openings adjacent to the mouth the openings for sealing gas may have a circular, elliptic or square cross section. Of course, the selection of a specific cross section of the openings may be based on the efficiency, i.e. an optimal deflection of the grazing gas flow and little sealing gas consumption. Reducing the flow of sealing gas raises the overall efficiency of a gas turbine, since supplying a sealing gas with a higher pressure than the pressure inside the chamber requires energy.

In principle, any suitable source of a high pressure gas that is available may be used for the aerodynamic shielding of grazing flows according to the invention. In case the damper is a flow through damper the sealing gas that flows through the opening to the chamber may be the similar to that gas that flows through the damper into the chamber.

The claimed invention may be based on any type of acoustic damper, for example a resonator with one or more damping volumes, a half-wave tube a quarter-wave tube, a multi-volume damper, a liner or any kind of acoustic flow-through damper.

The claimed invention also may be applied to dampers with no flow through of the acoustic damper type.

The claimed invention may preferably be applied if the mouth of the damper opens into a combustor chamber, a mixing chamber a plenum and/or an air channel of a gas turbine.

Further advantages and details of the claimed invention are subsequently described in conjunction with the drawings and their description.

DETAILED DESCRIPTION

Figure 2:
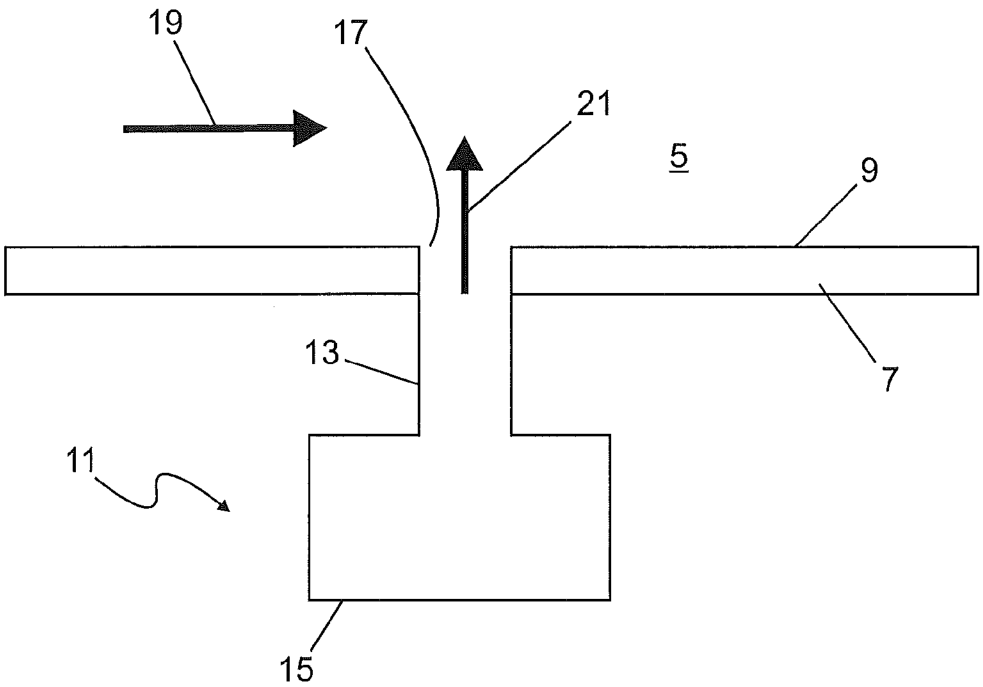
Fig. 2 prior art

FIG. 2 shows a schematic cross section of a chamber 5, for example a combustion chamber CC of a gas turbine that is limited by at least one wall 7 comprising an inner surface 9. As can be seen from FIG. 2, the chamber 5 is equipped with an acoustic damper 11 comprising a neck 13 and a damping volume 15. The neck 13 connects the damping volume 15 to the combustion chamber 5. The opening of the neck 13 towards the combustion chamber 5 is referred to as "mouth" 17 of the neck 13.

The damping device 11 in this exemplary embodiment may be a Helmholtz resonator, but the claimed invention is not limited to this type of acoustic damping device. The claimed invention may be used in conjunction with any type of acoustic damping device like a half-wave tube, a quarter-wave tube and the like. The claimed invention may be used in conjunction with flow through acoustic damping devices and acoustic damping devices without flow through.

As can be seen from FIG. 2, the mouth 17 of the neck 13 and the inner surface 9 of the wall 7 have the same level.

In the chamber 5 more or less parallel to the inner surface 9 a gas flows. This gas has a preferred direction of flow (illustrated by the arrow 19) and is also referred to as grazing flow 19. The preferred direction of this grazing flow 19 is essentially perpendicular to a bias flow 21 between the damping volume 15 and the combustion chamber 5 and disturbs the bias flow 21 through the neck 13. This negative effect of the grazing flow 19 on the bias flow 21 reduces the performance of the damper 11 as has been explained in conjunction with FIG. 1 above.

Figure 3:
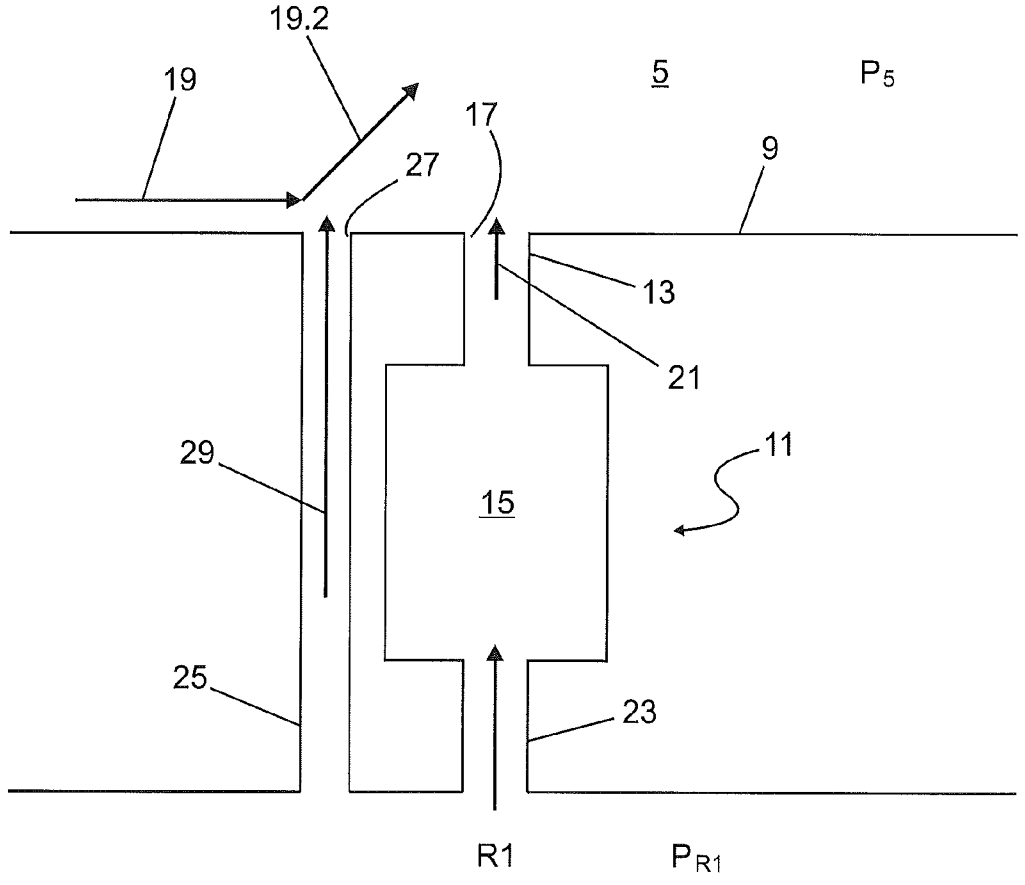

FIG. 3 illustrates a first embodiment of the claimed invention. The reference numerals used are the same as in FIG. 2 and therefore only the differences are described in detail.

In FIG. 3 the bias flow has a preferred direction of flow from left to right and therefore upstream of the mouth 17 in FIG. 3 means on the left side of the mouth 17.

In this embodiment the damper 11 is a flow through damper which means that the damping volume 15 is connected via the neck 13 with the combustion chamber 5. At the opposite end of the damping volume 15 the damping volume 15 is connected via a small bore 23 to a further chamber R1.

As can be seen from FIG. 3, adjacent to the mouth 17 and upstream of the mouth 17 there is a further bore 25 with an opening 27. The bore 25 connects chambers 5 and R1.

Since the pressure $p_{R1}$ in the chamber R1 is higher than the pressure $p_5$ in the chamber 5 sealing air flows through the bore 25 and the opening 27 from chamber R1 into chamber 5. Since the bore 23 has a rather small diameter its flow resistance is great and consequently the bore 23 restricts the bias flow 21 through the damper 11.

The resulting pressure difference $\Delta p$ ($=p_{R1}-p_5$) causes not only the bias flow 21 through damper 11, but a flow 29 of sealing gas through bore 25 and opening 27.

The flow resistance of the tube 23 is greater than the flow resistance of the neck 13. This means that the pressure reduction $\Delta p_{23}$ at the bore 23 is greater than the pressure reduction $\Delta p_{13}$ at the neck 13 of the damper. In other words: $\Delta p_{23} > \Delta p_{13}$.

This means that the tube 23 due to its small diameter and/or its length acts as a flow restrictor reducing the bias flow 21 through the neck 13.

The chamber R1 may be any high pressure environment, for example the hood or the liner pressure or a reservoir for cooling air. In most appliances of the claimed invention the chamber 5 is the combustion chamber of a gas turbine, but the claimed invention is not restricted to that.

The sealing gas flowing through bore 25 and entering the chamber 5 via opening 27 in a direction more or less perpendicular to the grazing flow 19 it deflects the grazing flow away from the mouth 17 of the damper 11.

As described in conjunction with FIG. 2 in the chamber 5, there may be a grazing flow 19 whose velocity is far greater than the velocity of the bias flow 21.

The flow resistance of the bore 25 is smaller than the flow resistance of the bore 23. This can be achieved by providing a larger diameter to bore 25 than to bore 23.

Consequently, a gas flow 29, illustrated by an arrow through the bore 25, is far greater than the bias flow 21 although the damper 11 and the bore 25 are supplied from the same chamber $R_1$ with air or gas and open into the same chamber 5.

As can be seen by comparison of the arrows 29 and 19, the velocity of the sealing gas flow through the bore 25 is even higher than the velocity of the grazing flow 19.

The great velocity of the air or gas flow 29 through the bore 25 deflects the grazing flow 19 away from the inner surface 9 and away from the mouth 17 of the damper 11, as is illustrated by the arrow 19.2 in FIG. 3. This effect is illustrated by the arrow 19.2 (deflected grazing flow).

Doing so, the grazing flow 19 does not reach the mouth 17 of the damper 11 and therefore the bias flow 21 is not disturbed by the grazing flow 19 anymore. Consequently, the efficiency and effectiveness of the damper 11 is high and independent from the grazing flow 19.

Figure 1:
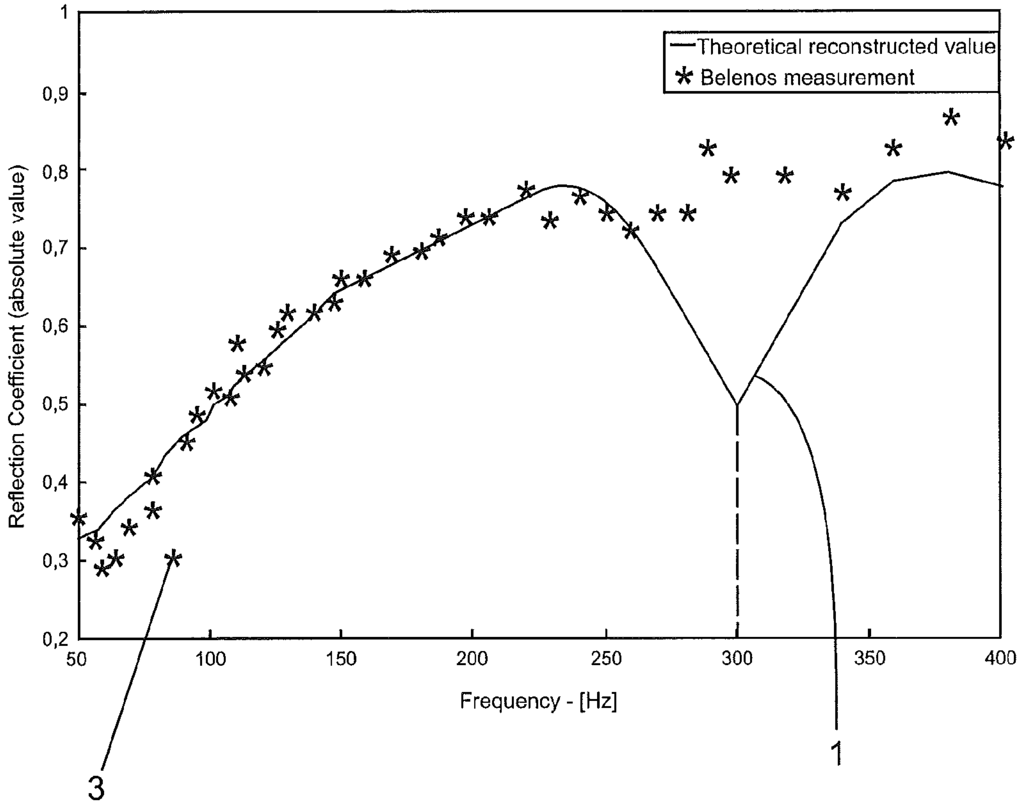
FIG. 1 The reflection coefficient of an exemplary acoustic damper with a resonance frequency at 300 Hertz, FIG. 2 a combustor chamber with an acoustic damper as known from the prior art and FIGS. 3 to 7 several embodiments of the claimed invention.

Going back to FIG. 1, the behavior of the damper 11 according to the claimed invention is similar to the line 1 in FIG. 1. Of course, this is only an example and the same invention may be applied to dampers 11 with damping frequencies different from 300 Hertz.

Figure 4:
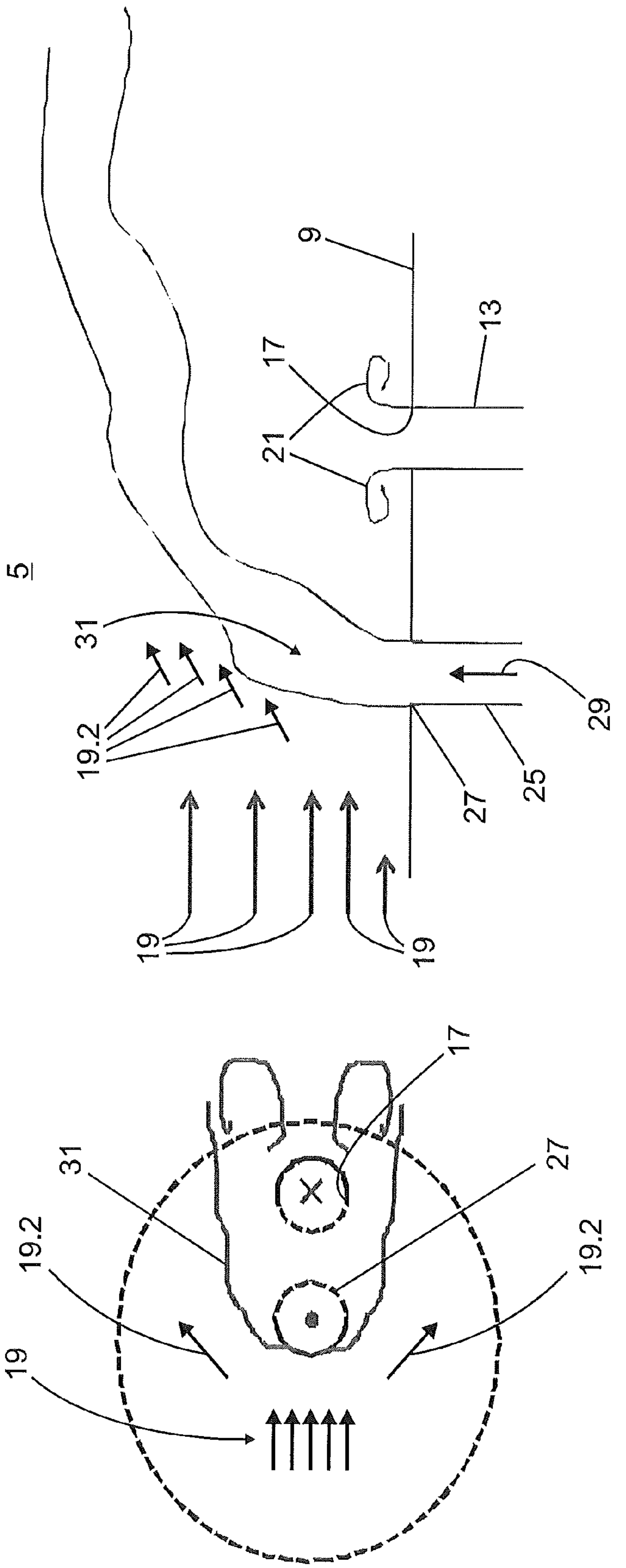

In FIG. 4 the same arrangement is shown in another perspective. In the right part of FIG. 4 it can be seen that the air or gas 29 that exits the opening 27 enters the chamber 5 with a high velocity and protects the mouth 17 of the damper 11 from the grazing flow 19 by deflecting the grazing flow 19 away from the inner surface 9 and the mouth 17. The gas or air entering the chamber 5 to the bore 25 is a wind shield 31 that protects the mouth 17 and the bias flow 21 of the damper from the grazing flow 19.

In other words: The mouth 17 is on the leeward side of the "windshield 31" that generated by the flow 29 of air or gas through the bore 25. Since the mouth 17 should be on the leeward side of the windshield 31 in most cases it is preferred that the at least one opening 27 is located upstream of the mouth 17.

On the left side of FIG. 4 a top view from the chamber 5 onto the inner surface 9 with the mouth 17 and the opening 27 is illustrated. It can be seen that the grazing flow 19 is also deflected in a lateral direction which further improves the effectiveness of the windshield 31.

Figure 5:
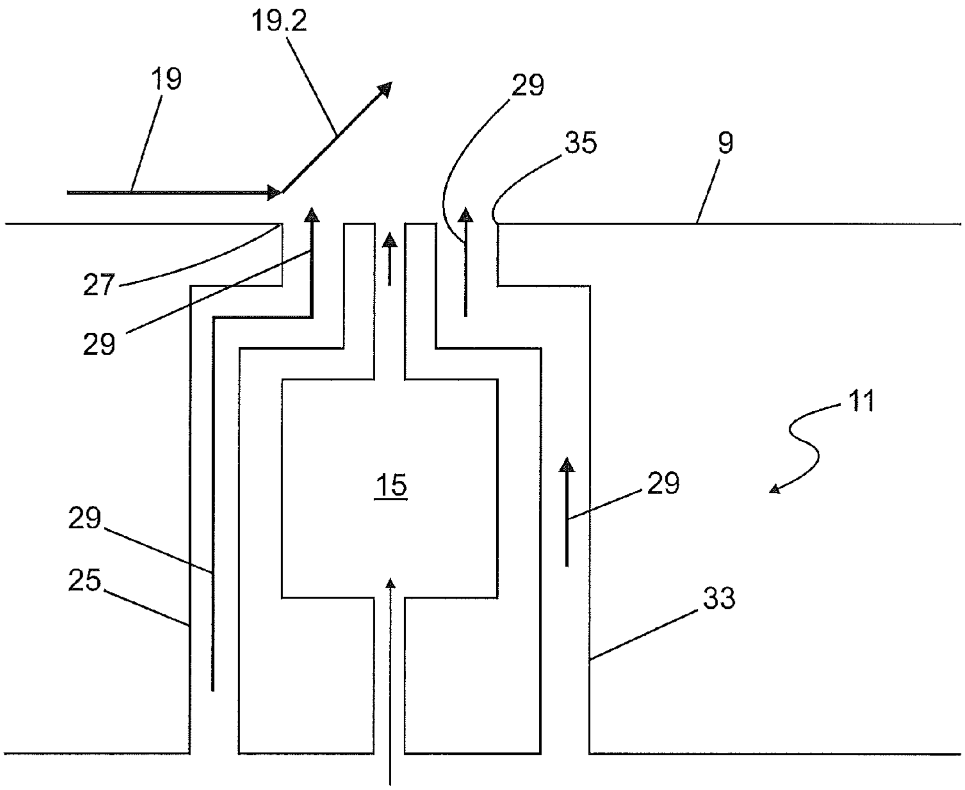

FIG. 5 illustrates a second embodiment of the invention with two bore 25 and 32 adjacent to the mouth 17 of the damper 11. In this case, one opening 27 is upstream of the mouth 17 and a further opening 35 is downstream of the mouth 17. As can be seen from FIG. 6, the windshield 37 derived from the air or gas stream through the opening 35 supports and reinforces the windshield 31 starting from the first opening 27.

Therefore, the bias flow 21 through the mouth 17 is even better protected from the grazing flow.

Figure 7:
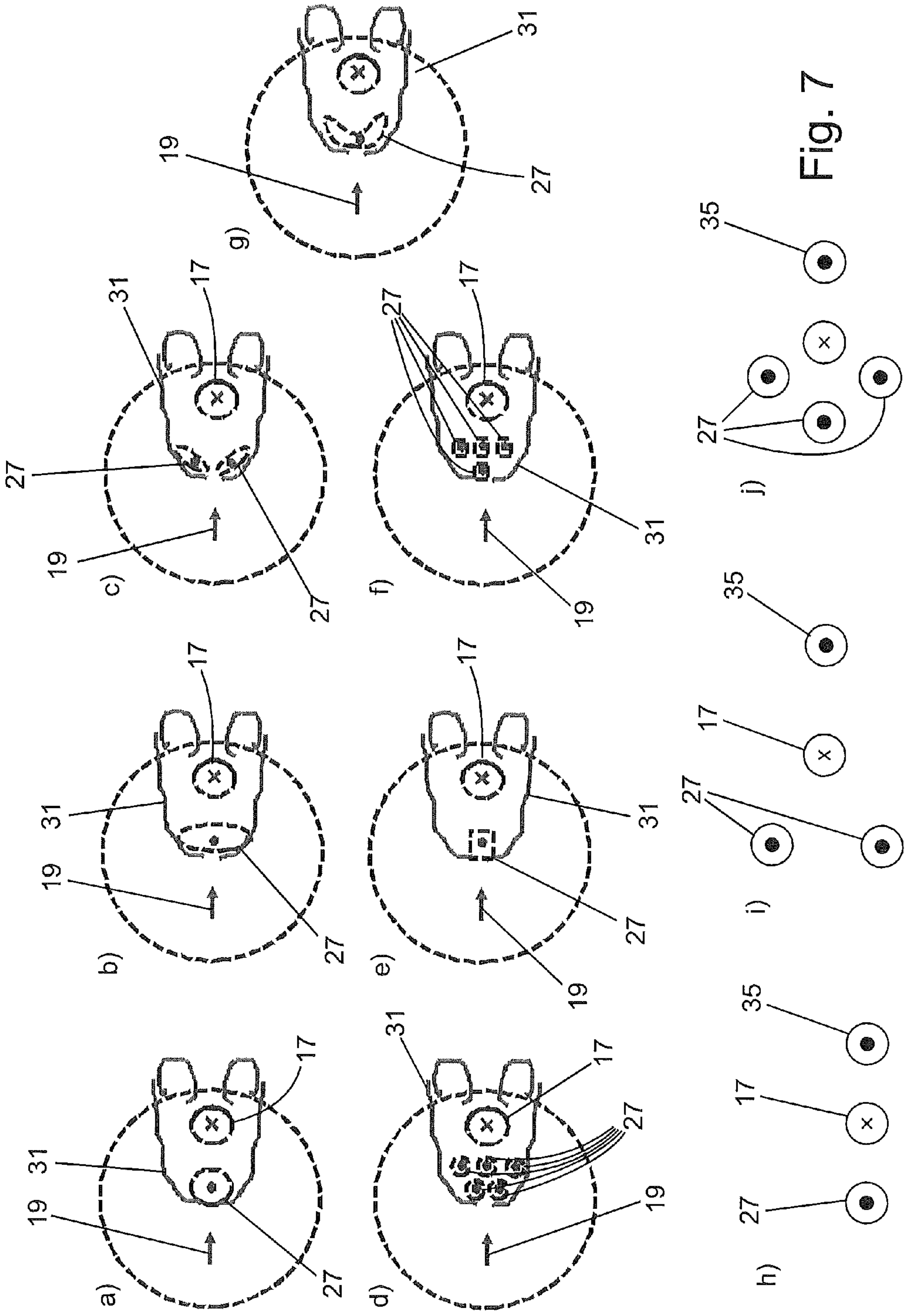

In FIG. 7 several designs and arrangements of the bores that serve to supply sealing gas or air 29 for building up a windshield 31 are illustrated.

The embodiment 7*a*) has already been described in conjunction with FIG. 4.

In the embodiment illustrated in FIG. 7*b*) the opening 27 has an elliptic cross-section which broadens the windshield 31 and therefore results in a better protection of the bias flow 21.

In the embodiment illustrated in FIG. 7*c*) there are two openings 27 with an elliptic cross-section arranged upstream of the mouth 17.

According to the embodiment, illustrated in FIG. 7*d*), there are five openings 27 with circular cross-sections located upstream of the mouth 17.

In FIG. 7*e*) there is one opening 7 with a rectangular cross-section and in FIG. 70 an embodiment is illustrated with four openings 27 with rectangular cross-section.

FIG. 7*g*) illustrates an embodiment with one opening 12 and 27 with a bent cross section.

Figure 6:
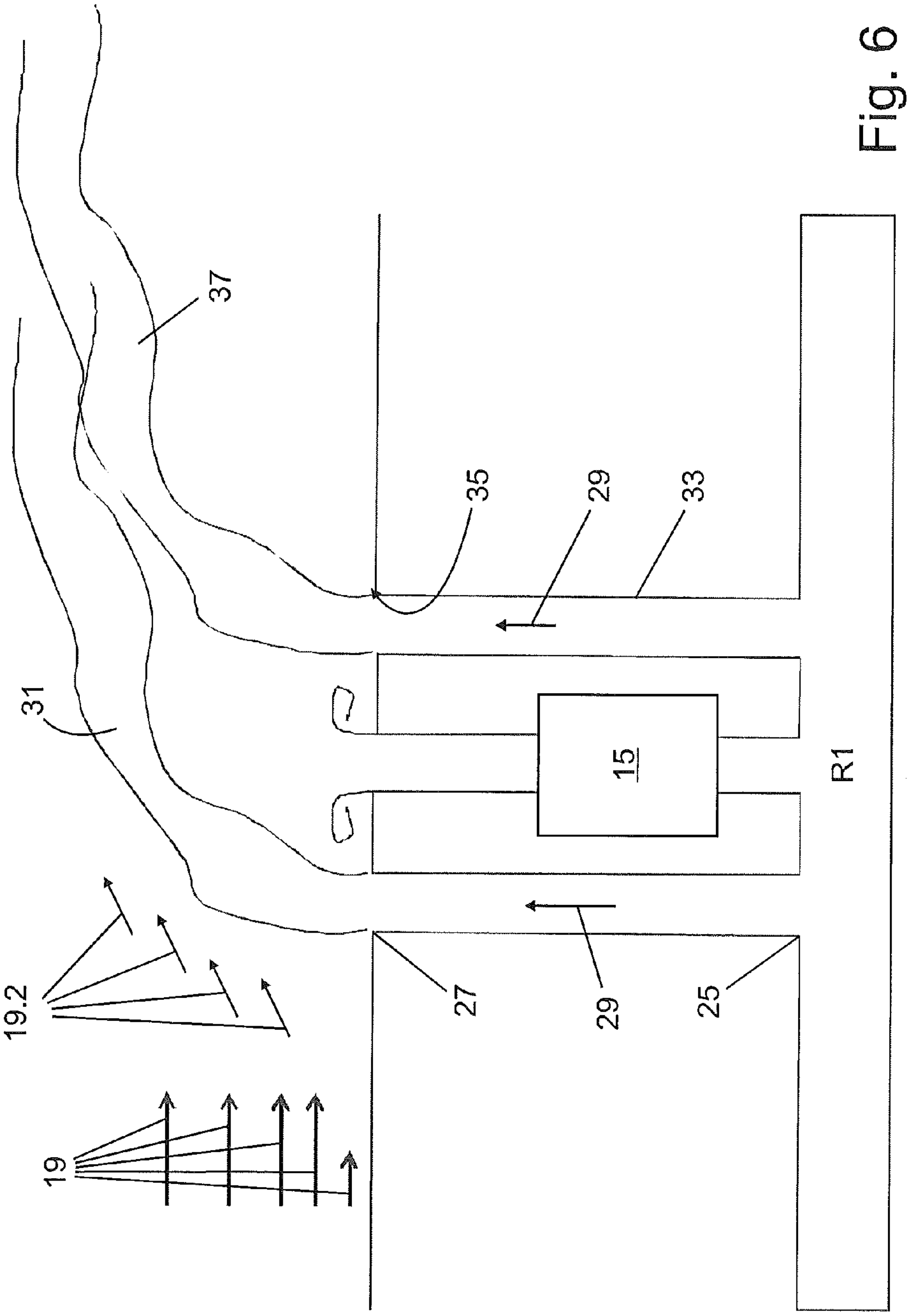

The embodiment illustrated in FIG. 7*h*) is known from FIGS. 5 and 6. The embodiments illustrated in FIGS. 7*e*) and 7*j*) illustrate further embodiments with three and four opening 27.

The invention claimed is:

1. An acoustic damper comprising:

a neck and a damping volume, wherein the neck comprises a mouth being in fluid connection with a chamber, wherein adjacent to the mouth of the neck at least one opening for a sealing gas is located;

the acoustic damper configured such that the at least one opening for the sealing gas is directed into the chamber to form a windshield in the chamber such that a grazing flow of gas passing through the chamber is deflected away from the mouth so that a bias flow of gas passing through the mouth is feedable into the chamber via the mouth independent of the grazing flow; and wherein the at least one opening for sealing gas is configured so that each of the at least one opening emits sealing gas into the chamber in a direction that is parallel to a direction at which the bias flow of gas is emitted from the mouth into the chamber and is perpendicular to the grazing flow; wherein each of the at least one opening is structured such that the sealing gas is emitted at a first velocity that is greater than a velocity of the bias flow and is also greater than a velocity of the grazing flow.

2. The damper according to of claim 1, wherein the at least one opening for sealing gas comprises at least one opening that is located upstream of the mouth.

3. The acoustic damper of claim 1, wherein the at least one opening comprises 3 to 8 openings that are located around the mouth of the neck.

4. The damper according to claim 1, wherein the at least one opening for sealing gas has circular, elliptic or square cross-section.

5. The damper according to claim 1, wherein the at least one opening for sealing gas is defined by a body of the damper to be supplied with gas from a hood of a gas turbine.

6. The damper according to claim 1, wherein the sealing gas that flows though the at least one opening is cooling air or a mixture of burnt or unburnt air and fuel.

7. The damper according to claim 1, wherein the damper is a Helmholtz resonator with one or more damping volumes, a half-wave tube, a quarter-wave tube, multi-volume damper, a liner or an acoustic flow through damper.

8. The damper according to claim 1, wherein the chamber is a combustor chamber, a mixing chamber, a plenum and/or an air channel of a gas turbine.

9. A gas turbine comprising:

a combustion chamber defined by at least one wall having an inner surface;

an acoustic damper comprising a neck and a damping volume, the neck having a mouth in the inner surface of the wall in fluid communication with the combustion chamber;

the combustion chamber configured such that a grazing flow of gas is flowing inside the combustion chamber along a portion of the inner surface;

the acoustic damper defining at least one opening adjacent the mouth configured to emit a sealing gas into the chamber upstream of the mouth in a direction of flow that is transverse to a direct on of flow of the grazing flow to deflect the grazing flow away from the mouth; and wherein the at least one opening is configured such that the sealing gas has a velocity that is greater than a velocity of the grazing flow and is greater than a velocity of a bias flow of gas that is passed through the mouth and into the combustion chamber via the acoustic damper.

10. The gas turbine of claim 9, wherein the at least one opening adjacent the mouth is configured to emit the sealing gas into the chamber upstream of the mouth in a direction of flow that is perpendicular to the direction of flow of the grazing flow to deflect the grazing flow away from the mouth.

11. The gas turbine of claim 9, wherein the acoustic damper is also configured to define at least one opening in the inner wall that is in fluid communication with the combustion chamber that is downstream of the mouth.

12. The gas turbine of claim 9, wherein the at least one opening includes 3 to 8 openings.

13. The gas turbine of claim 9, wherein the at least one opening is configured to emit the sealing gas into the combustion chamber to form a windshield such that the bias flow passing through the mouth is feedable into the chamber via the mouth independent of the grazing flow.

14. The gas turbine of claim 13, wherein the at least one opening includes 4 to 5 openings.

15. The gas turbine of claim 13, wherein the at least one opening includes 3 to 8 openings.

16. The gas turbine of claim 13, comprising:

a hood, the hood being in fluid communication with the at least one opening to supply the sealing gas to the at least one opening.

17. The gas turbine of claim 13, wherein the at least one opening has a circular cross-section, an elliptical cross-section, a polygonal cross-section, a rectangular cross-section, or a square cross-section.

* * * * *